United States Patent
Hanson

(10) Patent No.: US 10,694,716 B2
(45) Date of Patent: Jun. 30, 2020

(54) ANCHORING STAKE

(71) Applicant: Daniel W. Hanson, Orange, CA (US)

(72) Inventor: Daniel W. Hanson, Orange, CA (US)

( * ) Notice: Subject to any disclaimer, the term of this patent is extended or adjusted under 35 U.S.C. 154(b) by 509 days.

(21) Appl. No.: 15/688,447

(22) Filed: Aug. 28, 2017

(65) Prior Publication Data

US 2019/0059318 A1    Feb. 28, 2019

(51) Int. Cl.
| | | |
|---|---|---|
| *A01K 1/04* | (2006.01) | |
| *E02D 5/80* | (2006.01) | |
| *E04H 12/22* | (2006.01) | |
| *E04H 15/62* | (2006.01) | |

(52) U.S. Cl.
CPC ............ *A01K 1/04* (2013.01); *E02D 5/80* (2013.01); *E04H 12/223* (2013.01); *E04H 15/62* (2013.01)

(58) Field of Classification Search
CPC .............. E02D 5/80; A01K 1/04; E04H 15/62
USPC ................ 119/786; 135/118; 114/294, 230.1
See application file for complete search history.

(56) References Cited

U.S. PATENT DOCUMENTS

| | | | | |
|---|---|---|---|---|
| 707,683 | A * | 8/1902 | Farwell | E02D 5/803 52/160 |
| 1,189,787 | A * | 7/1916 | Caddy | E02D 5/803 52/160 |
| 1,805,084 | A * | 5/1931 | Gianini | E04H 15/62 52/161 |
| 2,431,609 | A | 12/1945 | Clapper | |
| 3,282,002 | A | 11/1966 | Taylor et al. | |
| 3,512,319 | A * | 5/1970 | Piacentino | E02D 5/803 52/160 |
| 3,974,604 | A * | 8/1976 | Conn | E02D 5/805 52/160 |
| 5,010,698 | A * | 4/1991 | Hugron | E02D 5/805 135/118 |
| 5,217,194 | A * | 6/1993 | Brownell | A63G 9/00 135/118 |
| 5,535,978 | A * | 7/1996 | Rodriguez | E04H 12/2269 135/118 |
| 5,613,458 | A | 3/1997 | Owen | |
| 6,481,364 | B2 * | 11/2002 | Woyjeck | A01K 1/04 114/230.1 |
| 6,606,829 | B2 | 8/2003 | Benincasa et al. | |
| 6,758,456 | B2 * | 7/2004 | Krieger | E02D 5/805 248/156 |
| 6,908,067 | B2 | 6/2005 | Clasen | |
| 7,185,461 | B2 * | 3/2007 | Lapointe | E02D 27/42 248/533 |
| 9,016,225 | B1 * | 4/2015 | Jenkins | B63B 21/24 114/230.1 |
| 9,187,925 | B2 * | 11/2015 | Esarey | E04H 15/62 |
| 9,822,546 | B1 * | 11/2017 | Durham | E04H 15/62 |
| D815,929 | S | 4/2018 | Sigston et al. | |
| D825,291 | S | 8/2018 | McDaniel | |
| D838,149 | S | 1/2019 | Hanson | |

(Continued)

*Primary Examiner* — Yvonne R Abbott-Lewis
(74) *Attorney, Agent, or Firm* — Mark S Hubert

(57) ABSTRACT

A stake to be inserted into the ground or other soft medium and used to moor a watercraft, tether an animal, support an umbrella or secure a tent includes a slide hammer having a central shaft, an enlarged tubular striking handle, and a spike hingedly mounted at a distal end of the shaft; whereby the spike can be folded against the shaft and stowed within the handle for safe handling. The spike can be spring-loadedly angularly locked in the deployed orientation.

17 Claims, 3 Drawing Sheets

(56) References Cited

U.S. PATENT DOCUMENTS

| | | | |
|---|---|---|---|
| 2003/0084620 A1* | 5/2003 | Benincasa | E02D 5/80 52/155 |
| 2005/0274083 A1 | 12/2005 | Shearer | |
| 2009/0114795 A1 | 5/2009 | Giannetto | |
| 2012/0240867 A1 | 9/2012 | Flynn | |
| 2014/0230866 A1 | 8/2014 | Paolucci | |
| 2015/0345099 A1* | 12/2015 | Griffiths | E02D 5/80 52/165 |

* cited by examiner

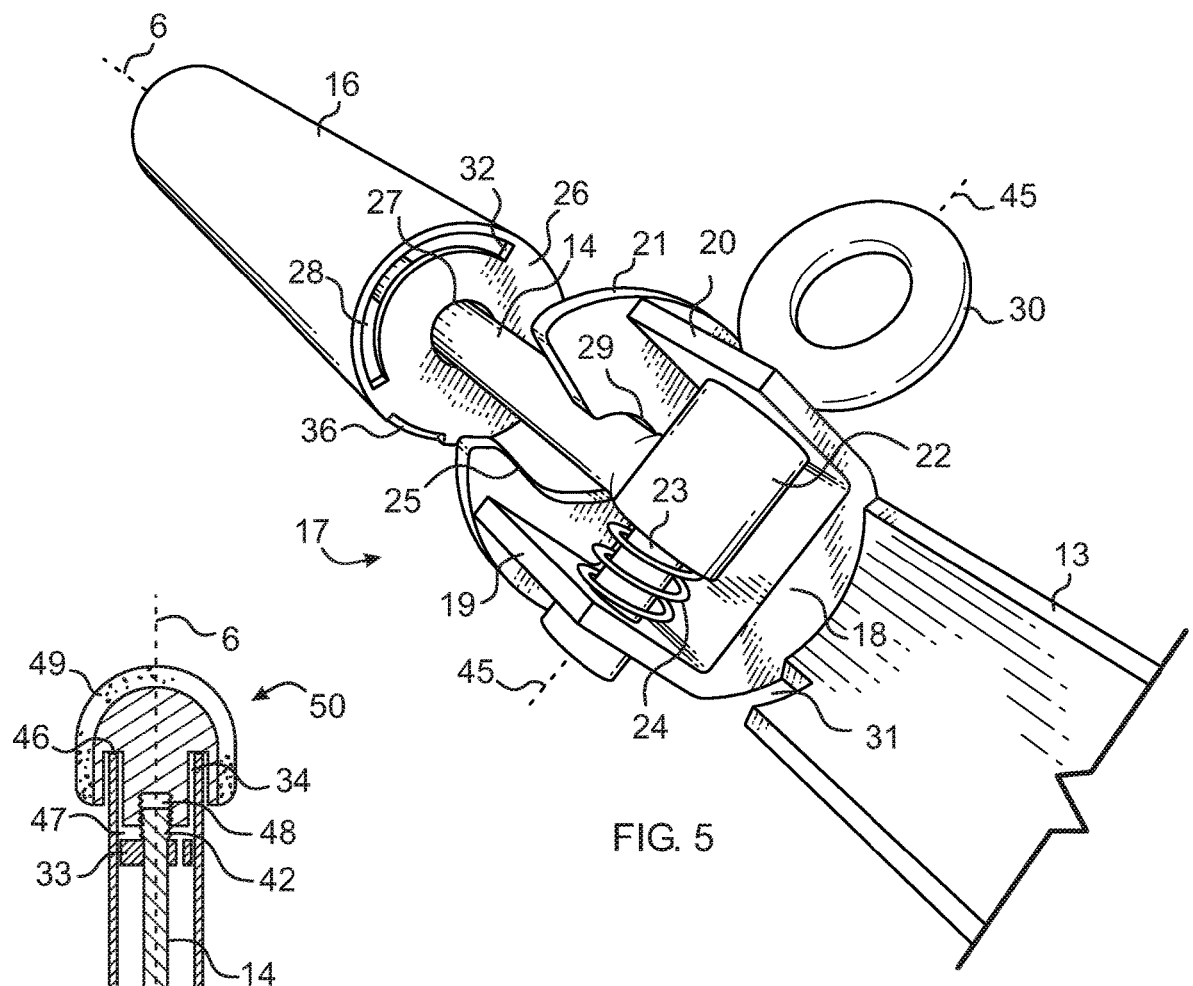
FIG. 5
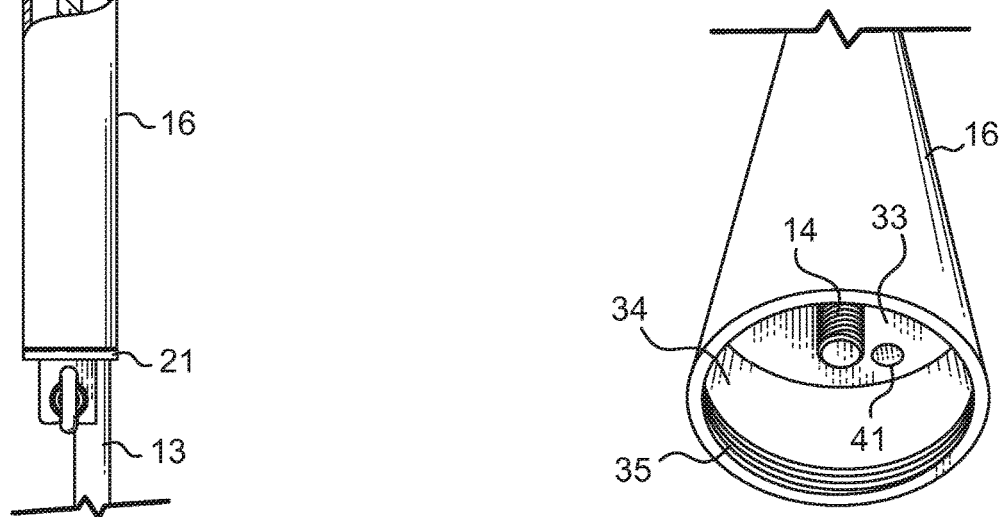
FIG. 7
FIG. 6

ANCHORING STAKE

FIELD OF THE INVENTION

This invention relates to anchoring devices designed to be driven into the ground, and more specifically to stakes having a sliding hammer used to drive it into the ground and remove it therefrom.

BACKGROUND

Various portable anchoring devices have been proposed for anchoring boats to shore using a stake affixed to the ground as an attachment point for a tether connected to the boat. Such devices can also be used as an attachment point for a leash in tying up pets such as dogs, and tie down lines for tents and other structures. Such devices can also be used to provide support to other temporary structures such as umbrellas, fishing rods, signs, drink holders, grills, gaming equipment, such as volleyball netting, and concession stands, for example.

Such portable anchoring devices often use an integrated slide hammer to force the stake to penetrate the ground as disclosed for example in Owen, U.S. Pat. No. 5,613,458. The slide hammer can also be used to remove the stake from the ground.

Unfortunately, such devices can be bulky, difficult to operate, and can expose the user to unwanted contact with the sharpened tip of the stake.

Therefore, there is a need for an apparatus which addresses one or more of the above identified inadequacies.

SUMMARY

The principal and secondary objects of the invention are to provide an anchoring stake that is unitary, compact and safe to store and transport without any exposed sharp component that could injure a person or damage a carrier. These and other objects can be achieved by a stake having an a hingedly connected spike which can be stored within the hammer handle.

In some embodiments there is provided an anchoring device to be inserted into the ground or other soft medium and used to moor a watercraft, tether an animal or secure a tent, wherein the device comprises a slide hammer having a central shaft and an enlarged tubular striking handle; and a spike hingedly mounted at a distal end of the shaft; whereby the spike can be folded against the shaft and stowed within the handle for safe handling.

In some embodiments the handle acts as an enclosure and a slide hammer weight.

In some embodiments the spike can be spring-loadedly locked in the deployed orientation.

In some embodiments the device further comprises a hinge assembly spring-biased to lock the spike in the deployed position.

In some embodiments there is provided an anchoring device which comprises: a shaft having a proximal end and a distal end; a spike movably secured to the distal end; a tubular enclosure engaged over the proximal end; and, said spike being movable from a deployed position to a stowed position within the enclosure.

In some embodiments the device is unitary and the enclosure is slidingly engaged over the shaft.

In some embodiments the shaft, enclosure and spike are substantially commensurate.

In some embodiments the shaft, enclosure and spike are substantially commensurate in axial length.

In some embodiments the device further comprises a hinge assembly rotatively securing the spike to the shaft.

In some embodiments the hinge assembly comprises a striking plate located perpendicularly opposite the spike;

In some embodiments the hinge assembly further comprises: at least one ear perpendicularly secured to the spike; a pivot pin supported by said ear; and a bearing secured to said distal end, said bearing being rotatively engaged by the pivot pin.

In some embodiments the hinge assembly further comprises a spring biased to urge the spike into said stowed position.

In some embodiments the hinge assembly further comprises two parallel ears astride of said bearing.

In some embodiments said striking plate has an notch shaped and dimensioned to nest the shaft in said deployed position.

In some embodiments the enclosure further comprises a plug partially closing said distal end, said plug having a central opening engaged by the shaft and a lateral opening engaged by the spike in said stowed position.

In some embodiments said lateral opening is shaped and dimensioned to be commensurate with the cross-sectional shape of said spike, whereby debris can be scraped from said spike as it is being journaled through the opening during a stow operation.

In some embodiments the spike has a lateral indentation sized and dimensioned to engaged an edge of said lateral opening.

In some embodiments said hinge assembly further comprises a tether-securing eyelet.

In some embodiments said hinge assembly further comprises said eyelet being rotatively fixed with respect to said pivot pin.

In some embodiments said device further comprises a threaded mounting socket on a proximal portion of said enclosure.

In some embodiments said device further comprises a stopping head wider than said central opening and secured to the shaft near said proximal end.

In some embodiments said device further comprises a threaded bolt extending axially proximally from said stopping head.

In some embodiments said device further comprises an object engaging said threaded bolt and bearing against said enclosure to force said enclosure against said hinge assembly, thereby preventing axial movement of said enclosure along said shaft.

In some embodiments there is provided an anchoring stake which comprises: a slide hammer having a central shaft and an enlarged tubular striking handle; and a spike hingedly mounted at a distal end of the shaft; whereby the spike can be folded against the shaft and stowed within the handle.

In some embodiments said stake further comprises a hinge assembly spring-biased to lock the spike in a deployed position.

The original text of the original claims is incorporated herein by reference as describing features in some embodiments.

BRIEF DESCRIPTION OF THE DRAWINGS

FIG. 5 is a diagrammatic partial perspective view of the hinge assembly with the spike in the deployed orientation.

FIG. 6 is a perspective end view of an alternate version of the proximal end of the stake.

FIG. 7 is a diagrammatic partial cross-sectional cutaway lateral view of the enclosure axially locked by a protective cap.

DESCRIPTION OF THE EXEMPLARY EMBODIMENTS

Figure 1:
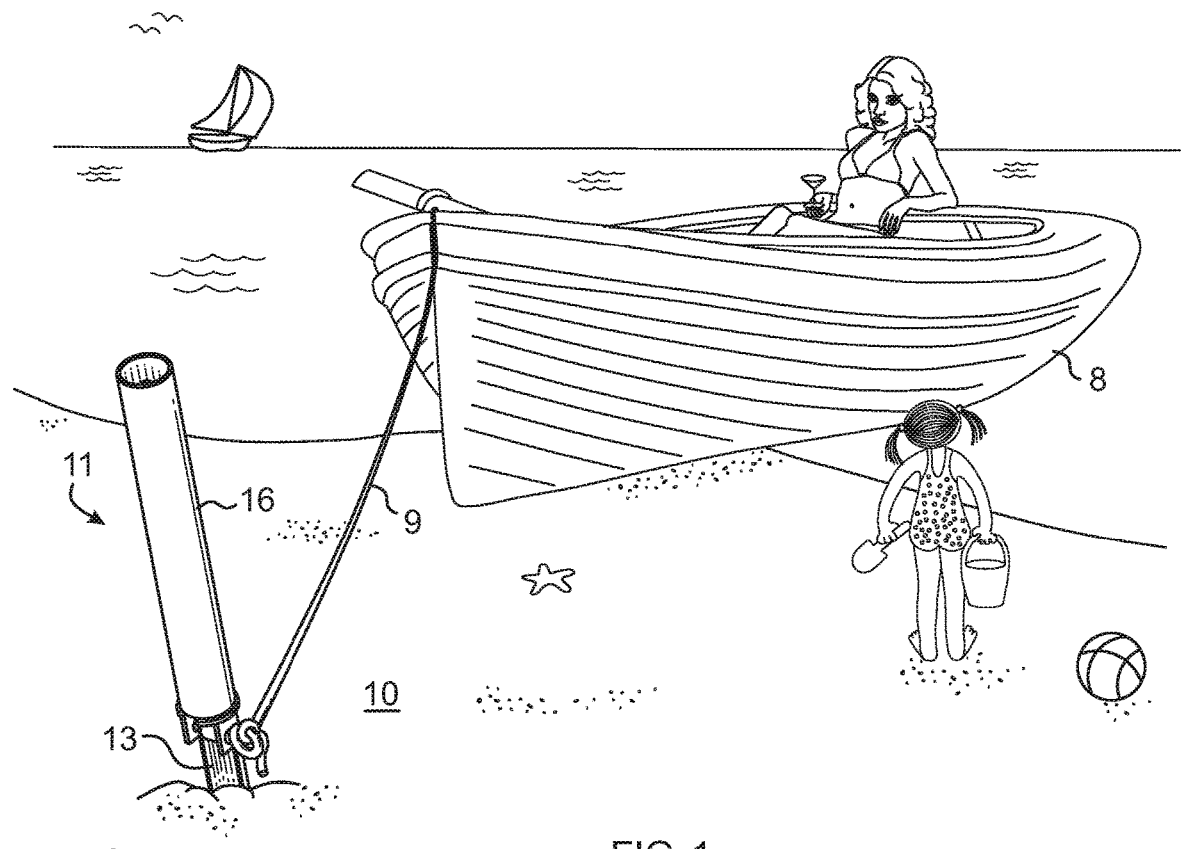
FIG. 1 is a diagrammatic perspective view of a hand-operable stake embedded into the ground acting as a boat anchor.
Figure 2:
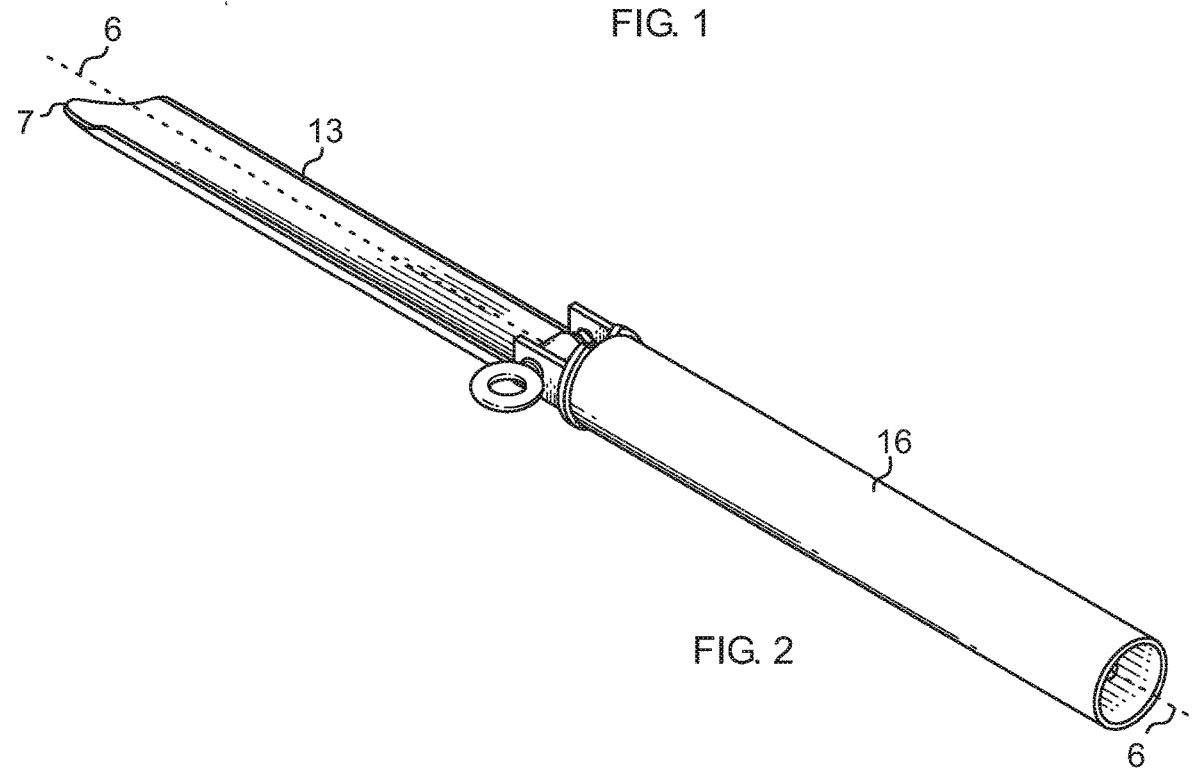
FIG. 2 is a diagrammatic perspective view thereof with the spike in the deployed orientation.
Figure 3:
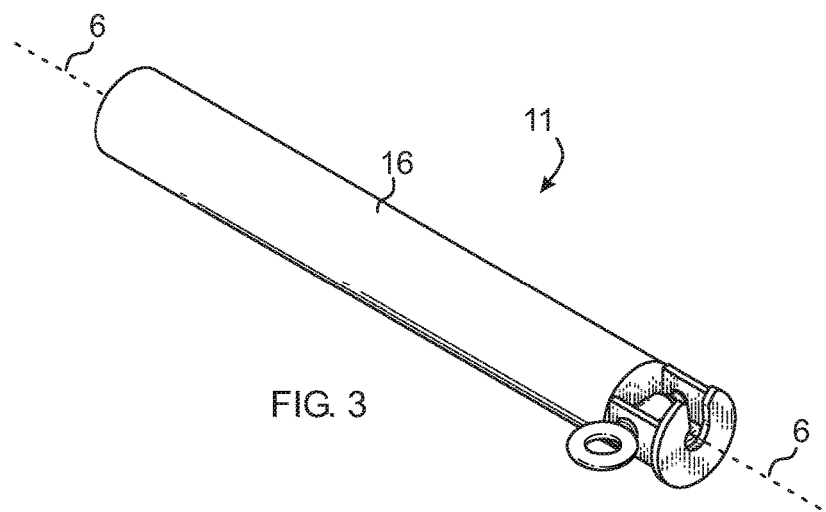
FIG. 3 is a diagrammatic perspective view thereof with the spike in the stowed orientation.
Figure 4:
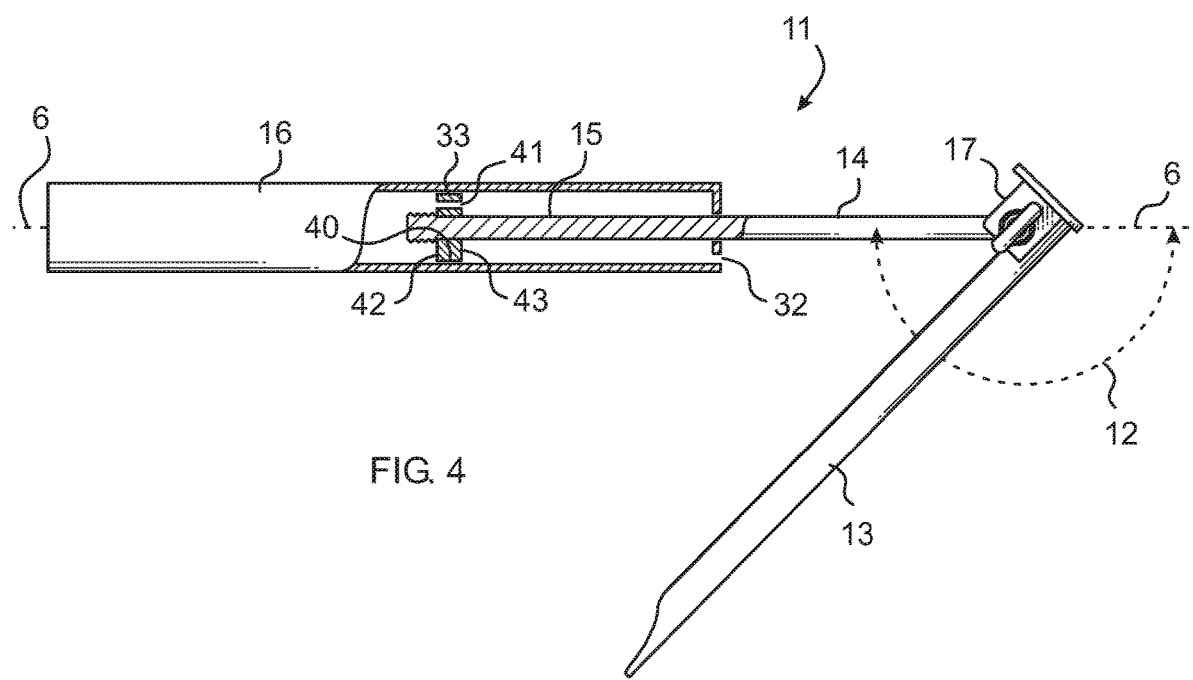
FIG. 4 is a diagrammatic partial cross-sectional cutaway lateral view thereof with the spike in the intermediately retracted orientation.

Referring now to the drawing, there is shown in FIGS. 1-4 an anchoring stake device 11 according to an exemplary embodiment of the invention. FIG. 1, by way of example, shows the stake device 11 embedded in the ground 10 acting as a temporary, removable anchor for a boat 8 connected to a tether 9. FIG. 2 shows the stake device where its blade-shaped spike 13 having a sharpened distal tip 7 is in the fully deployed and locked position in alignment with a tubular enclosure 16 along a central axis 6. FIG. 3 shows the stake device with its spike in the stowed position within the tubular enclosure 16, thereby providing a highly compact configuration for storage and transport, and to shield contact with the sharpened distal tip. In FIG. 4 the stake device is shown in an intermediary folded position with arrow 12 indicating the angular rotating movement of the spike 13 from full deployment to the pre-stowing folded or retracted position.

The stake device 11 can include a shaft 14 elongated in the direction of the central axis 6. The shaft can have a proximal end 15 which can be slidingly journaled into the tubular enclosure 16 by engaging a central hole 27 in a plug 26 closing the distal end of the enclosure. The spike 13 can be connected to the shaft by a hinge assembly 17. The spike and the shaft can be substantially commensurate with the enclosure which can house them both simultaneously. Notably, the enclosure can act as a hammer weight by being reciprocatingly moved axially along the shaft. Thus, the enclosure can be a length of tubing made from solid, durable, heavy material such as steel. Indeed, the entire device including the enclosure, spike, shaft, and hinge assembly can be made of steel, or other durable materials such as aluminum, various plastics, carbon fiber, or other composite materials.

The spike 13, shaft 14, enclosure 16 and the hinge assembly 17 can form a unitary device, that is one in which those components are not separated, but are connected in a single integrated unit.

As more specifically illustrated in FIG. 5, the hinge assembly 17 can include a substantially U-shaped bracket 18 welded to the proximal end of the spike 13. Alternately, the spike and bracket can be stamped, molded or otherwise formed from a unitary piece of material. The bracket can form two parallel ears 19,20 projecting orthogonally from the spike. A plate 21 can span the proximal edges of the ears in a direction perpendicular to and opposite the spike, thus offering a striking surface for the slide hammer constituted by the enclosure 16 moving along the shaft 14. A bearing 22 can be welded to the distal end of the shaft which captures a pivot pin 23 supported by the twin ears 19,20 of the U-shaped bracket. The bearing can rotate about a rotational axis 45 defined by the pivot pin. The rotational axis can be perpendicular to the central axis 6. A notch 25 in the striking plate is shaped and dimensioned to engage and angularly lock the shaft to the bracket in the deployed position of the spike. The notch can have a wider angular dimension at the periphery of the striking plate which gradually narrows toward a circular pit 29 at the center of the striking plate into which the rests the distal end of the shaft. This facilitates maintaining axial alignment of the hammer stroke with the spike for more efficient insertion of the spike into the ground and extraction of the spike from the ground during removal. A coil spring 24 can be mounted on the pivot pin and act between the bearing and the bracket to urge the distal end of the shaft toward its locked position, nested within the circular pit 29. The plug 26 at the distal end of the enclosure can have a lateral opening 28 configured to receive the spike in its stowed position. The shape of the lateral opening can mimic the cross-sectional profile of the spike so that the spike can slide axially through the opening and scrape off debris to partially clean the blade during a stow operation which transitions into the spike stowed position. The spike has an indentation 31 shaped and dimensioned to engage an edge 32 of the lateral slot in the plug to lock the spike in its stowed position, and prevent axial movement of the spike with respect to the enclosure while the indentation is engaged. A recess 36 extends radially inwardly from the outer edge of the enclosure at the distal end to act a convenient point to wedge apart the enclosure from the hinge assembly when disengaging the spike from its stowed position. An eyelet 30 or other fastening implement is mounted on the hinge assembly. The eyelet can be fixed to an end of the pivot pin. In this way, the eyelet can rotate along with the pivot pin into a preferred rotational orientation. Alternately, the eyelet can be fixed with respect to the hinge assembly. Accordingly, the enclosure 16 forms a handle that can be actioned along the shaft 14 to hit the striking plate 21 of the deployed spike 13.

As illustrated in FIG. 4, a stopping head 33 can be secured to the shaft 14 near its proximal end. The stopping head can be welded or otherwise formed onto the shaft. Alternately, the shaft can be threaded and the stopping head held in place by a cooperatively threaded nut. The stopping head not only prevents the shaft from escaping the enclosure 16, but also can be violently thrusted against the plug 26 to extract the spike from the ground. The head can have an outer diameter 40 commensurate with an inner diameter of the enclosure so that movement between the shaft and enclosure can be kept in axial alignment. The head can also include one or more axially oriented pressure relief passageways such as one or more holes 41 extending through the head from it proximal surface to its distal surface. One or more such passageways can help prevent fluid pressure build up inside the enclosure during operation of the hammer which can diminish the impact force of the hammer.

As illustrated in FIG. 6, a socket 34 may be provided in the proximal portion of the enclosure 16 to accommodate an umbrella pole, fishing rod or other rod-like support. The socket can have threads 35, either internally as shown, or externally, or use other fastening means to temporarily secure the stake device 11, in either it spike deployed or spike stowed position, to other structures having cooperative fastening means for myriad other uses.

As illustrated in FIG. 7, a threaded bolt 42 can extend axially proximally from said stopping head 33 so that the bolt may be engaged from the proximal end of the enclosure 16, through the socket 34 by a cooperatively threaded receptacle 48 of another object such as a padded end cap 50. When tightly screwed upon the threaded bolt, the end cap bears against the rim 46 of the socket at the proximal end of the enclosure preventing axial movement of the enclosure along the shaft 14. Care is taken so that an axial gap 47 exists between the distal part of the cap and the stopping head so that the threaded bolt can be adequately drawn up within the receptacle and force the distal end of the enclosure against the striking plate 21 of the deployed spike 13 further locking the spike in the deployed position. A layer of padding 49 on the exposed outer surface of the cap can help protect against inadvertent harmful contact against the proximal end the stake when placed in the ground.

Although the spike is shown having a substantially semi-cylindrical shape, other shapes can be used without departing from the invention such as semi-quadrangular cross-sectional shapes having an open side which can parallelly nest the shaft in the stowed position, and solid cross-sectional shapes such as circles, ellipses, squares, rectangles, ovals, where the shaft does not nest within the spike in the stowed position. Similarly, although the enclosure and shaft head are shown to have a substantially cylindrical shape, other shapes can be adequately used.

Although the above described stake is shown as a unitary device, those skilled in the art will appreciate that the features of the stake can be formed onto part of a more complex device such as a flag pole, or umbrella post, for example. In this way, the enclosure feature can act as the distal end of an elongated feature of the more complex device.

While the preferred embodiments of the invention have been described, modifications can be made and other embodiments may be devised without departing from the spirit of the invention and the scope of the appended claims.

What is claimed is:

1. A unitary anchoring device which comprises:
   a shaft having a proximal end and a distal end;
   a hinge assembly;
   a spike rotatively secured to said distal end of said shaft by said hinge assembly;
   a tubular enclosure slidingly engaged over the proximal end;
   wherein the shaft, enclosure and spike are substantially commensurate; and
   said spike being movable from a deployed position to a stowed position within the enclosure.

2. The device of claim 1, wherein said hinge assembly comprises a striking plate located perpendicularly opposite the spike.

3. The device of claim 2, wherein said hinge assembly further comprises:
   at least one ear substantially perpendicularly secured to the spike;
   a pivot pin supported by said ear; and
   a bearing secured to said distal end, said bearing being rotatively engaged by the pivot pin.

4. The device of claim 3, wherein said hinge assembly further comprises a spring biased to lock the spike in said deployed position.

5. The device of claim 3, wherein said hinge assembly further comprises two parallel ears astride of said bearing.

6. The device of claim 3, wherein said striking plate has an notch shaped and dimensioned to nest the shaft in said deployed position.

7. The device of claim 1, wherein:
   the enclosure further comprises a plug partially closing said distal end, said plug having a central opening engaged by the shaft and a lateral opening engaged by the spike in said stowed position.

8. The device of claim 7, wherein said lateral opening is shaped and dimensioned to be commensurate with the cross-sectional shape of said spike, whereby debris can be scraped from said spike as it is being journaled through the opening during a stow operation.

9. The device of claim 7, wherein the spike has a lateral indentation sized and dimensioned to engaged an edge of said lateral opening.

10. The device of claim 7, which further comprises a stopping head wider than said central opening and secured to the shaft near said proximal end.

11. The device of claim 10, which further comprises a threaded bolt extending axially proximally from said stopping head.

12. The device of claim 11, which further comprises an object engaging said threaded bolt and bearing against said enclosure to force said enclosure against said hinge assembly, thereby preventing axial movement of said enclosure along said shaft.

13. The device of claim 1, wherein said hinge assembly further comprises a tether securing eyelet.

14. The device of claim 13, wherein said hinge assembly further comprises said eyelet being rotatively fixed with respect to said pivot pin.

15. The device of claim 1, which further comprises a threaded mounting socket on a proximal portion of said enclosure.

16. An anchoring stake which comprises:
   a slide hammer having a central shaft and an enlarged tubular striking handle;
   a spike hingedly mounted at a distal end of the shaft; and
   a hinge assembly spring-biased to lock said spike in a deployed position;
   whereby the spike can be folded against the shaft and stowed within the handle.

17. The device of claim 16, which further comprises a hinge assembly spring-biased to lock the spike in a deployed position.

* * * * *